United States Patent [19]
Brown et al.

[11] Patent Number: 5,804,222
[45] Date of Patent: Sep. 8, 1998

[54] CO-EXTRUSION HEAD FOR COATING WIRE

[76] Inventors: Jearl D. Brown, P.O. Box 42, Dexter, Mo. 63841; Jerry A. Bannister, 1312 McDougal Ave., Sikeston, Mo. 63801

[21] Appl. No.: 848,682

[22] Filed: Apr. 29, 1997

[51] Int. Cl.[6] .................. B29C 47/02; B29C 47/06; B29C 47/12
[52] U.S. Cl. .................. 425/113; 425/131.1; 425/133.1; 425/183; 425/186; 425/190; 425/192 R; 425/462; 425/467
[58] Field of Search .................. 425/113, 131.1, 425/133.1, 183, 186, 190, 192 R, 462, 467

[56] References Cited

U.S. PATENT DOCUMENTS

| | | | |
|---|---|---|---|
| 3,404,432 | 10/1968 | White et al. | 425/113 |
| 3,896,764 | 7/1975 | Kindl et al. | 425/113 |
| 4,165,957 | 8/1979 | Kertscher . | |
| 4,212,612 | 7/1980 | Piper et al. | 425/113 |
| 4,421,465 | 12/1983 | Herrington | 425/133.1 |
| 4,484,877 | 11/1984 | Stucke et al. | 425/113 |
| 4,690,627 | 9/1987 | Sebile | 425/113 |
| 4,773,954 | 9/1988 | Starnes | 425/113 |
| 4,806,425 | 2/1989 | Chu-Ba . | |
| 4,998,870 | 3/1991 | Seibert | 425/113 |
| 5,031,568 | 7/1991 | Milliman . | |
| 5,156,715 | 10/1992 | Starnes | 425/113 |
| 5,183,669 | 2/1993 | Guillemette . | |
| 5,316,583 | 5/1994 | Milliman . | |
| 5,332,379 | 7/1994 | Baumgarten . | |
| 5,468,137 | 11/1995 | Becktel et al. . | |
| 5,565,218 | 10/1996 | Brown et al. . | |
| 5,641,445 | 6/1997 | Fauble et al. | 425/133.1 |
| 5,672,303 | 9/1997 | Metzger et al. | 425/113 |

*Primary Examiner*—Khanh P. Nguyen
*Attorney, Agent, or Firm*—Haverstock, Garrett & Roberts

[57] ABSTRACT

An extrusion head includes a first housing member and second housing member each with a passageway extending therethrough, the two housing members being attached to each other such that the respective passageways are aligned. The first housing member includes structure positioned within the passageway for applying a coating material (such as PVC) to a wire as it is drawn therethrough. The second housing member includes an inlet channel adapted to be attached to a source of nylon, the inlet channel extending to a recessed groove in the end of the second housing member, which end is adjacent to the first housing member, such groove surrounding a surface configured to form a spacing between the two housing members through which spacing the nylon passes in a direction toward the wire as it is drawn therethrough. The groove is offset relative to the position of the wire as it is drawn therethrough for uniformity of flow of the nylon, and the nylon is applied over the coating material substantially simultaneously as the coating material is applied to the wire.

15 Claims, 5 Drawing Sheets

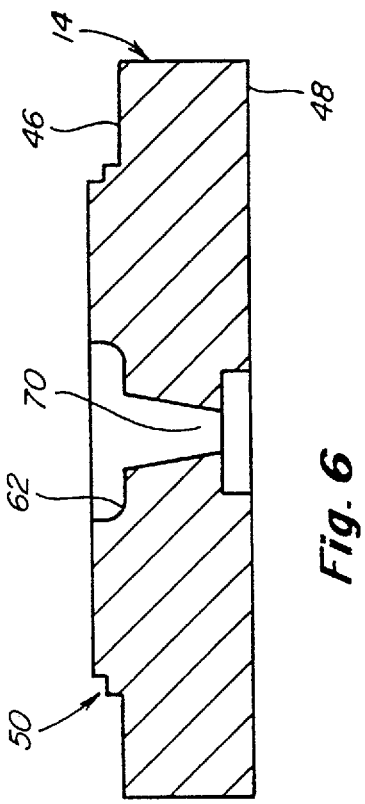
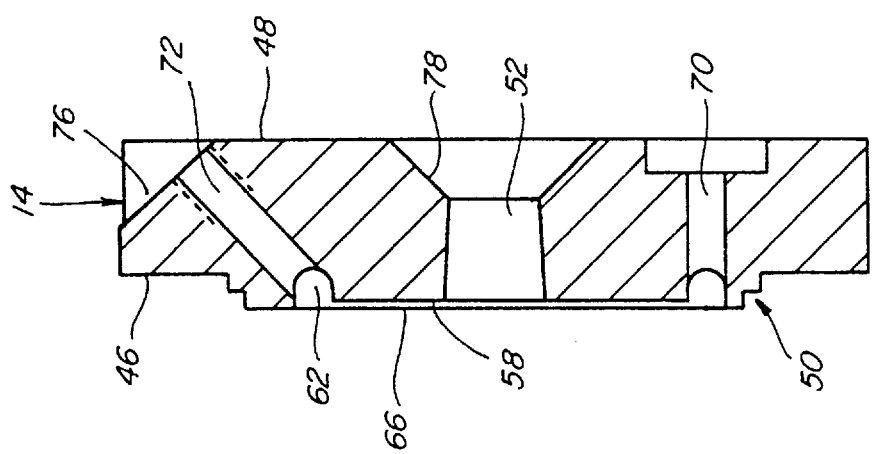

CO-EXTRUSION HEAD FOR COATING WIRE

FIELD OF THE INVENTION

This invention relates generally to devices for applying coating materials to wire and more particularly, to extrusion heads for coating a wire with two different coating materials in one step.

BACKGROUND OF THE INVENTION

The applicants of the present invention have previously described and patented an extrusion head for coating a wire with an extrudable material in U.S. Pat. No. 5,565,218. The extrusion head described therein can be utilized to coat a wire with a material such as polyvinyl chloride (PVC) or nylon. As explained in U.S. Pat. No. 5,565,218 it is sometimes desirable to coat a wire with both PVC and nylon, and in the past this has typically been accomplished at two different stages, utilizing two different extrusion heads, as generally indicated by FIG. 7 of U.S. Pat. No. 5,565,218. Utilizing two different stages and two different extrusion heads increases the cost and possible down time associated with applying two coating materials to a wire.

Accordingly, it is desirable and advantageous to provide a device for applying two coating materials to a wire in a substantially simultaneous manner. It also is desirable and advantageous to provide a device capable of providing accurate application of both coating materials onto a wire.

A principal object of the present invention is to provide an extrusion device for applying two different coating materials onto the outer surface of a wire.

Another object of the present invention is to provide an extrusion device for accurately applying each of two coating materials onto the outer surface of a wire.

SUMMARY OF THE INVENTION

These and other objects of the invention are attained by an apparatus which, in one embodiment, is an extrusion head configured to allow two coating materials to be applied to the outer surface of a wire substantially simultaneously.

The extrusion head includes a housing formed of two 440 C stainless steel members, the first housing member configured to engage an extrusion machine wherein the coating material, in the form of polymeric materials including thermoplastics such as PVC, is heated to the desired temperature such that the material flows as necessary. The first housing member includes first and second ends and an outer surface, a portion of which is cut away to allow engagement with a corresponding block located on the extrusion machine. An inlet channel extends through the surface of the cut away portion of the first housing member allowing the coating material to flow into the interior of the housing. Further, a passageway extends from end to end of the first housing member and at least a portion of the passageway is tapered in frusto-conical fashion such that the diameter at one end of the passageway is smaller than the diameter at the opposite end of the passageway. Positioned within the passageway of the first housing member is means for applying a layer of extrudable material onto a wire as the wire is drawn through the passageway from the first end of the first housing member to the second end thereof. Such means includes a plurality of die members substantially as described in U.S. Pat. No. 5,565,218. The layer of extrudable material is generally applied as the wire leaves the passageway of the first housing member at the second end thereof The first housing member second end also includes an end surface which defines the opening of the passageway.

The second housing member has first and second ends and a passageway extending from end to end therethrough. The first end of the second housing member is adapted for attachment to the second end of the first housing member such that the respective passageways thereof are substantially aligned. The second housing member first end includes a first surface which defines the opening of the passageway, a groove which surrounds the first surface and is recessed relative thereto, and a second surface which surrounds the groove. The first surface is recessed relative to the second surface, and the groove is offset relative to a central axis of the passageway along which a wire being coated travels.

When the second housing member is attached to the first housing member, the second surface of the second housing member makes sealing contact with the end surface of the first housing member and the first surface of the second housing member is positioned a predetermined distance from the end surface of the first housing member. The second housing member includes an inlet channel having one end adapted for attachment to a source of coating material such as nylon, the other end of the inlet channel extending into the recessed groove.

During the extrusion process, a wire is drawn through the passageway of the first housing member and the die members positioned therein. The coating material flows through the first housing member inlet channel into the interior of the first housing member toward the second end thereof At the same time, nylon is fed, via the second housing member inlet channel, into the groove of the second housing member and flows around the groove, then inward toward the wire through the space between the first surface of the second housing member and the end surface of the first housing member, where the coating material and nylon meet and are applied substantially simultaneously over the wire. The offset positioning of the groove enables the nylon to flow inward toward the wire in a substantially uniformly manner from all directions.

Thus, utilizing the extrusion device of the present invention a coating material such as PVC can be applied to a wire, and a nylon coating can simultaneously be applied over the PVC.

BRIEF DESCRIPTION OF THE DRAWINGS

FIG. 5 is a cross-sectional view along line 5—5 of FIG. 3;

FIG. 6 is an enlarged cross-sectional view along line 6—6 of FIG. 4;

DETAILED DESCRIPTION OF THE DRAWINGS

Figure 1:
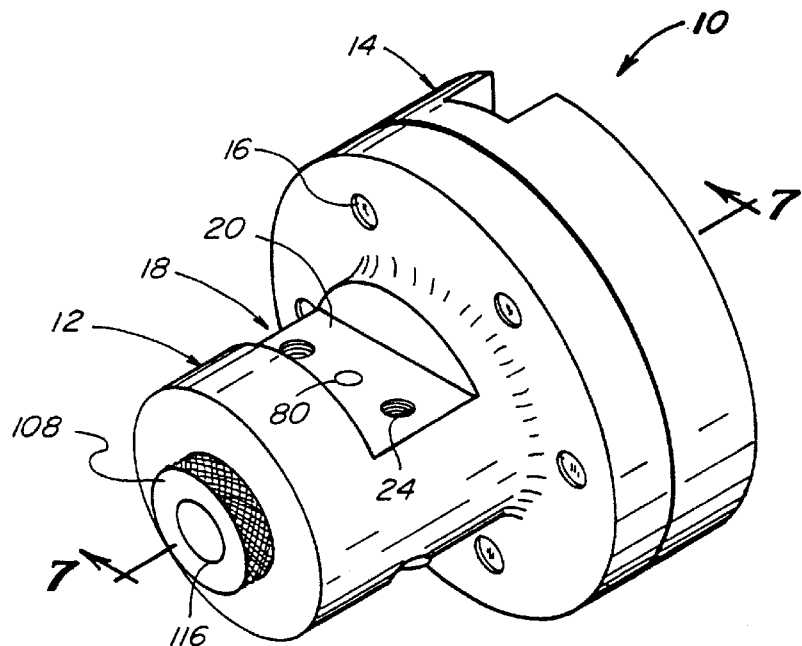
FIG. 1 is a perspective view of an extrusion head constructed in accordance with the present invention.

FIG. 1 illustrates a perspective view of an extrusion head 10 constructed in accordance with the present invention. The extrusion head 10 includes a first housing member 12 and a second housing member 14 secured to each other via bolts 16, the ends of which are shown. The first housing member 12 has an outer surface a portion of which is cut out as indicated at 18. The cut out portion 18 is configured to engage an extrusion machine so as to be attached thereto and includes a planar surface 20. In this regard, when the first housing member 12 is attached to an extrusion machine, two bolts such as bolt 22, shown in FIG. 2, extend through corresponding holes such as hole 24 and threadedly engage a portion of the extrusion machine so as to secure the first housing member 12 thereto.

Figure 2:
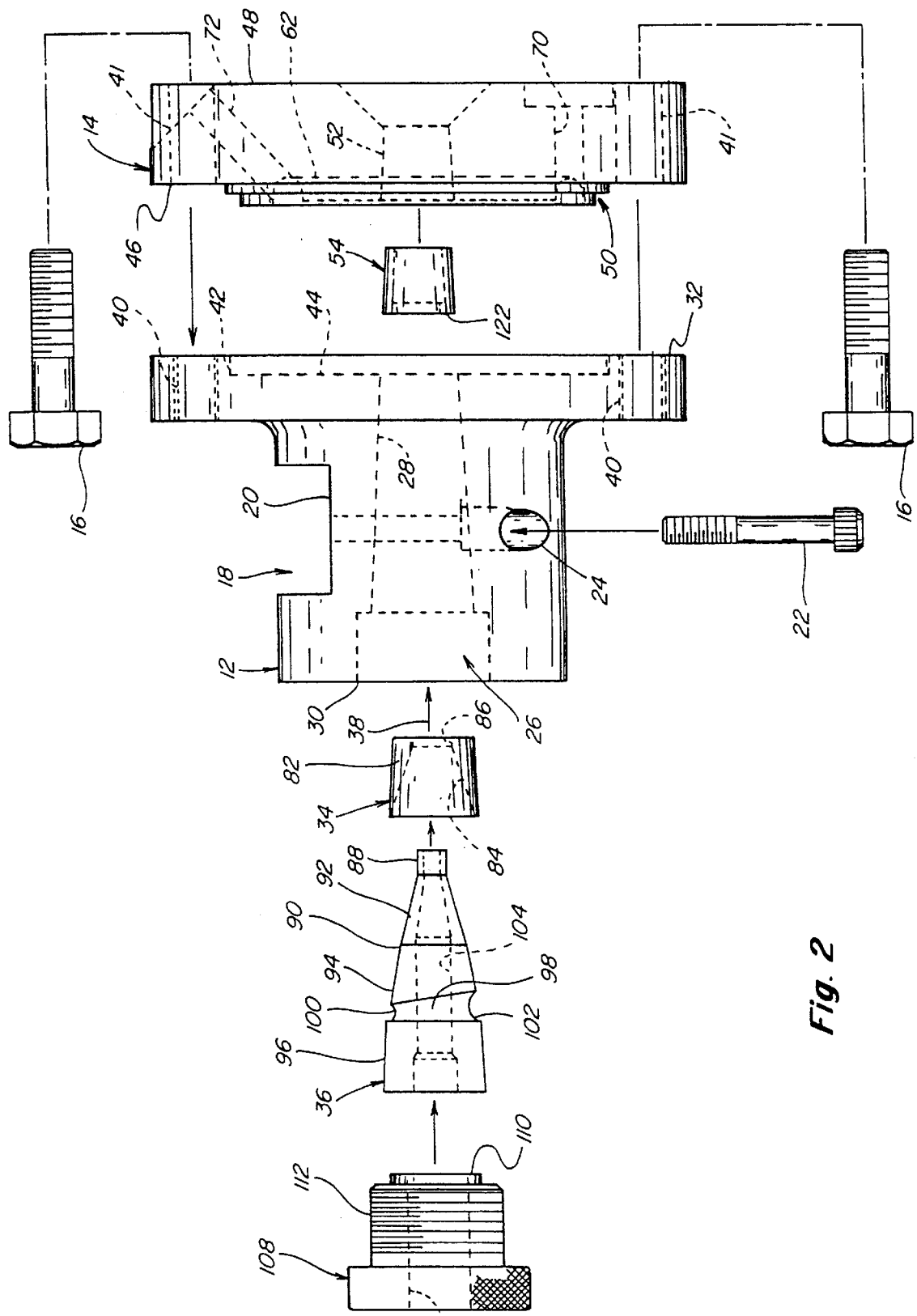
FIG. 2 is an exploded side view of the extrusion head of FIG. 1.

A passageway 26, shown in shadow in FIG. 2, extends through the first housing member 12, at least a portion 28 of the surface forming the passageway 26 being tapered in frusto-conical fashion. The first housing member 12 includes first and second ends 30 and 32 respectively. The passageway 26 is smaller in diameter at second end 32 than at the opposite end 30 thereof This larger diameter at first end 30 allows die members 34 and 36 to be inserted within the passageway 26 as indicated by the arrow 38. The tapered portion 28 of the passageway 26 aids in securing die members 34 and 36 therewithin. The second end 32 of the first housing member includes a plurality of threaded holes 40 through which bolts 16 extend, which holes 40 are aligned with corresponding holes 41 in the second housing member 14 for attaching second housing member 14 to first housing member 12. The second end 32 of the first housing member also includes a recessed portion 42 in which an end surface 44 is located, end surface 44 defining the opening of the passageway 26.

The second housing member 14 includes first and second ends 46 and 48 respectively, first end 46 having a raised portion 50 which extends toward first housing member 12 and is configured for insertion in the recessed portion 42 thereof A passageway 52 extends from end to end of the second housing member 14 and at least a portion of passageway 52 is tapered to receive a correspondingly tapered die member 54.

Figure 3:
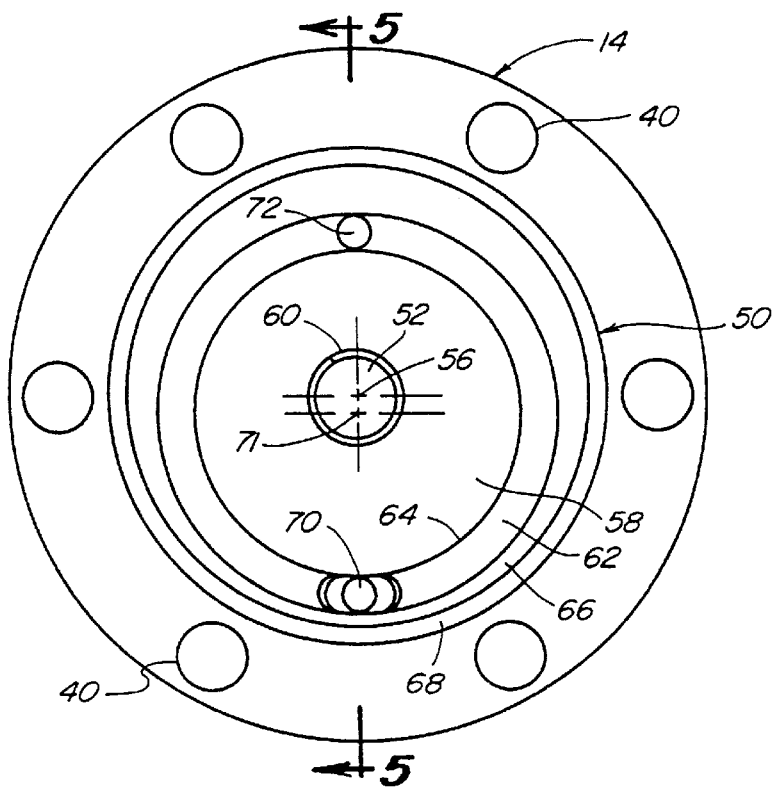
FIG. 3 is an end view depicting the first end of the second housing member.
Figure 4:
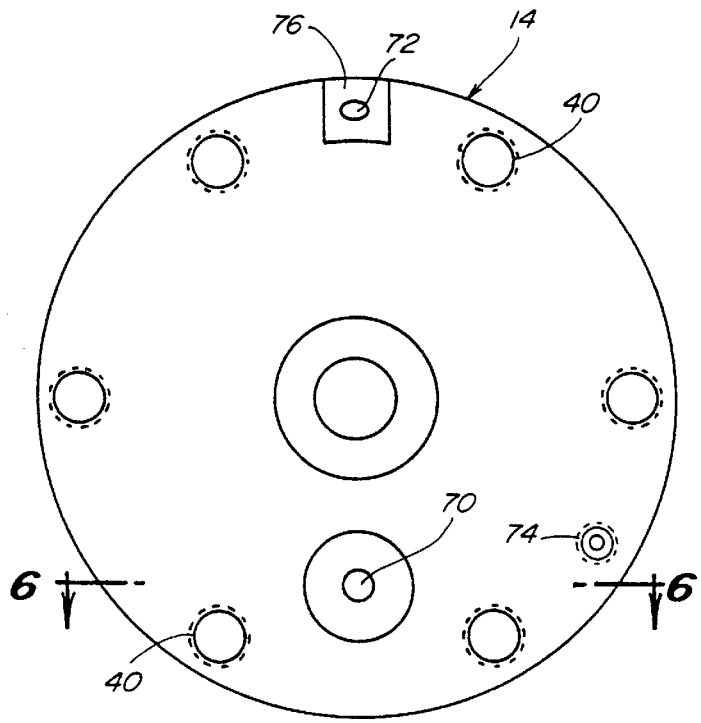
FIG. 4 is an end view depicting the second end of the second housing member.

Referring to FIG. 3, a view of first end 46 of second housing member 14 is shown. Raised portion 50 includes a number of features which are important to the present invention. A central axis 56 of passage way 52 is shown, and generally depicts the position of a wire as it is drawn therethrough. A first surface 58 defines the first end opening 60 of passageway 52. A recessed groove 62 surrounds the first surface 58, an inner edge 64 defining the boundary between the two. A second surface 66 surrounds the recessed groove 62 and a third surface 68 surrounds the second surface 66. The recessed groove 62 is offset relative to the central axis 56, in a direction toward an inlet channel 70. Where recessed groove 62 is cylindrical, center point 71 designates the center of such groove 62 and the direction of offset. The portion of the groove 62 at inlet channel 70 is preferably furthest from central axis 56 while the portion of the groove 62 spaced approximately one-hundred eighty degrees from inlet channel 70 is preferably closest to central axis 56. Referring to FIG. 4, a view of second end 48 of second housing member 14 is shown. The inlet channel 70 is adapted for connection to a source of nylon, and extends through the second housing member 14 into the recessed groove 62. The groove 62 is offset from central axis 56 in order to provide uniform flow of nylon from the groove toward central axis 56. Because the nylon flows into the groove at the location of inlet channel 70, and must then flow around the groove, it is important that those portions of the groove 62 which are circumferentially spaced from the inlet channel 70 be closer to central axis 56 in order to provide uniform flow of the nylon thereto. Accordingly, the groove 62 is offset as previously described. A relief channel 72 is also depicted in FIG. 4, which relief channel 72 similarly extends through the second housing member 14 to the annular groove 62. A threaded opening 74 is also depicted, and may be utilized for attachment of a thermocouple well.

The cross-sectional view in FIG. 5 illustrates that the end of release channel 72 is threaded for receiving a plug member (not shown) and the relief channel 72 extends from a location along groove 62 toward second end 48 and radially outward. A portion 76 of second end 48 is machined to provide flat surface for boring the release channel 72. Relief channel 72 is provided to bleed nylon out of second housing member 14 if necessary. The relative relationship between first surface 58 and second surface 62 is also shown, first surface 58 being recessed relative to second surface 66. For the purposes of the present invention is has been determined that the spacing of first surface 58 to second surface 66 in the range from about five thousandths of an inch (0.005 inches) to about 50 thousandths (0.050 inches) may be utilized with varying degrees of success. Accordingly, in order to obtain such dimensions, it is apparent that such surfaces should be finely machined. In addition, a portion 78 of passageway 52 also tapers outwardly toward second end 48 for enabling simpler access to the interior thereof The enlarged cross-sectional view of FIG. 6 illustrates that the inlet channel preferably includes a taper from second end 48 toward the groove 62. Such taper is advantageous in that it allows nylon to flow into and around the groove more efficiently.

Figure 7:
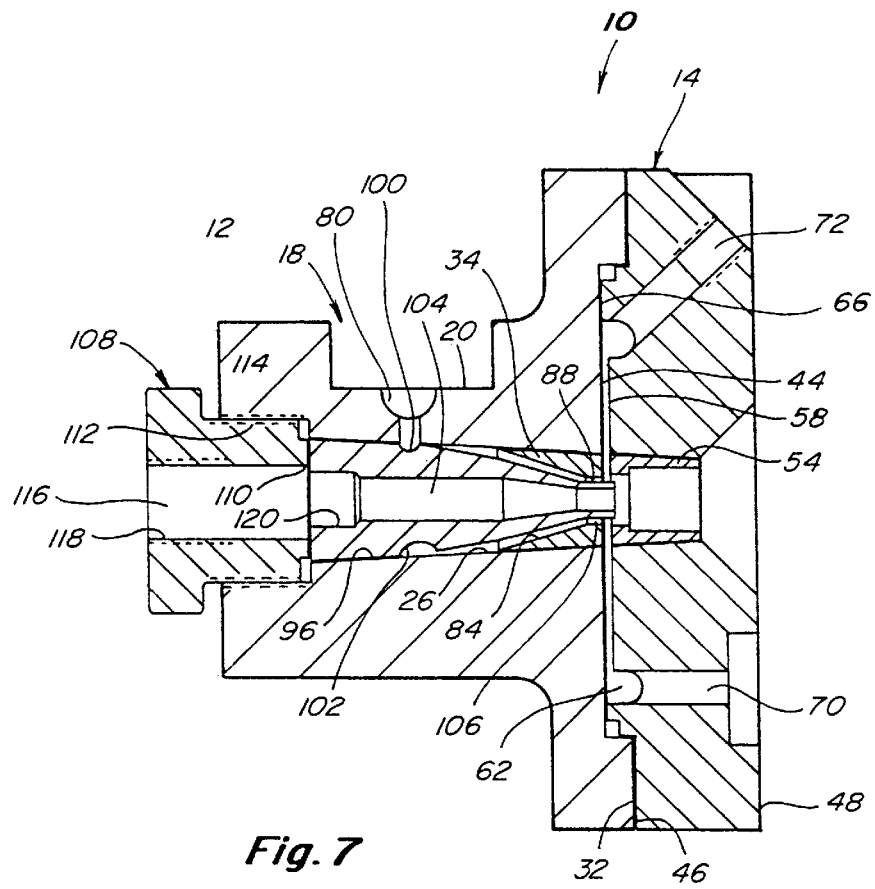
FIG. 7 is an enlarged cross-sectional view along line 7—7 of FIG. 1.

A cross-sectional view of the assembled extrusion head 10 is shown in FIG. 7. An inlet channel 80 extends through the surface 20 to the passageway 26. When the extrusion head 10 is attached to an extrusion machine, the inlet channel 80 aligns with a source of coating material, such as PVC, which is heated, and typically under pressure, allowing the material to flow into the passageway 26 of the first housing member 12. Referring to FIG. 2, die member 34 has a tapered outer surface 82 in similar fashion to the tapered portion 28 of the passageway 26. As shown in FIG. 7, when inserted within the passageway 26 the die member 34 is pushed toward the second end thereof. At this location the outer surface 82 of the die member 34 engages the tapered portion 28 of the passageway 26, the taper of the outer surface 82 corresponding to the taper of the portion 28. Thus, a secure mating engagement of the die member 34 within the passageway 26 is achieved and the surface-to-surface contact between the die member 34 and the portion 28 forms a sealed condition therebetween. The die member 34 also includes an axially extending opening 84 (shown in shadow in FIG. 2) from end to end thereof at least a portion 86 of which is substantially cylindrical.

An intermediate die member 36, shown in FIG. 2, is also configured to fit within the passageway 26. The intermediate die member 36 includes a nose portion 88 and an outer surface 90 having several tapered portions 92, 94, and 96, as well as an annular groove 98. The tapered portion 92 has a higher degree of taper than the portion 90. The annular groove 98 circumscribes the intermediate die member 36 and includes a narrow portion 100 which tapers to a wider portion 102, the wider portion 102 being approximately 180 degrees opposite the narrow portion 100. With regard to the annular groove 98, the configuration of such annular groove 98 is substantially as described in U.S. Pat. No. 5,565,218 in order to enable uniform flow of a coating material such as PVC. As shown in FIG. 7, when inserted within the first housing portion 12, the narrow portion 100 of annular groove 98 aligns with the inlet channel 80 and the wider portion 102 is spaced approximately 180 degrees from the inlet channel 80. Also shown in FIG. 7 is the passage 104 through intermediate die member 36.

The nose portion 88 of the die member 36 is configured to fit within the cylindrical portion 86 of the opening 84 in the first die member 34. The outer diameter of the nose portion 88 is slightly smaller than the inner diameter of the cylindrical portion 86 such that an annular gap 106 is formed therebetween. It is through this annular gap 106 that the PVC or other coating material, extrudes onto the wire. The thickness of the coating extruded onto the wire will vary as the size of the annular gap varies. In operation, the coating material flows into the inlet channel 80, around the annular groove 98, and toward the nose portion 88 of the intermediate die member 36 and is extruded through the annular gap 106 in a substantially uniform manner. In this regard, the outer surface 90 of the intermediate die member 36, in combination with the inner surfaces of the first housing member 12 and the die member 34 define the flow path of the coating material.

The intermediate die member 36 is held within the passageway 26 by its engagement with the passageway 26 and by a plug member 108. The intermediate die member 36 is inserted from the larger diameter end of the passageway 26 and pushed therein until the tapered portion 96 engages the passageway 26 as shown in FIG. 7. One end 110 of the plug member 108 is configured to engage the end of the intermediate die member 36 and at least a portion 112 of the outer surface of the plug member 108 is threaded to engage a correspondingly threaded portion 114 of the passageway 26. After the intermediate die member 36 has been inserted in the passageway 26, the plug member 108 is then threaded into the passageway until the end 110 thereof engages the intermediate die member 36 so as to securely hold the intermediate die member 36 in position. The outer surface of the exposed end of the plug member 108 is serrated to facilitate gripping and rotating of the plug member 108. A passage 116 also extends through the plug member 108, a rear portion 118 of the passage 116 being threaded so as to receive a tube or pipe, not shown, which provides a vacuum during the extrusion process to pull the coating material onto the surface of the wire. Further, adjacent the end of the intermediate die member 36 is a portion 120, shown in FIG. 7, having a hex configuration so as to receive an Allen wrench. The Allen wrench may be utilized during assembly of the extrusion head 10 to rotate the intermediate die member 36 in the event that the narrow portion 100 and the inlet channel 80 become misaligned when the plug member 108 is threaded into the first housing member 12.

When assembled, the first end 46 of second housing member 14 is attached to second end 32 of first housing member 12. The first surface 58 of second housing member 14 is spaced a predetermined distance from the end surface 44 of first housing member 12. The second surface 66 of second housing member 14 engages the end surface 44 in a sealed relationship. Thus, the predetermined distance between surfaces 44 and 58 is determined by the relationship between the first and second surfaces 58 and 66 of second housing member 14. Although such predetermined distance may range from about five thousandths of an inch (0.005 inches) to about fifty thousandths of an inch (0.050 inches), it has been determined that, when using type 6 nylon, the distance is preferably in the range from about twenty thousandths of an inch (0.020 inches) to about thirty thousandths of an inch (0.030 inches).

Figure 8:
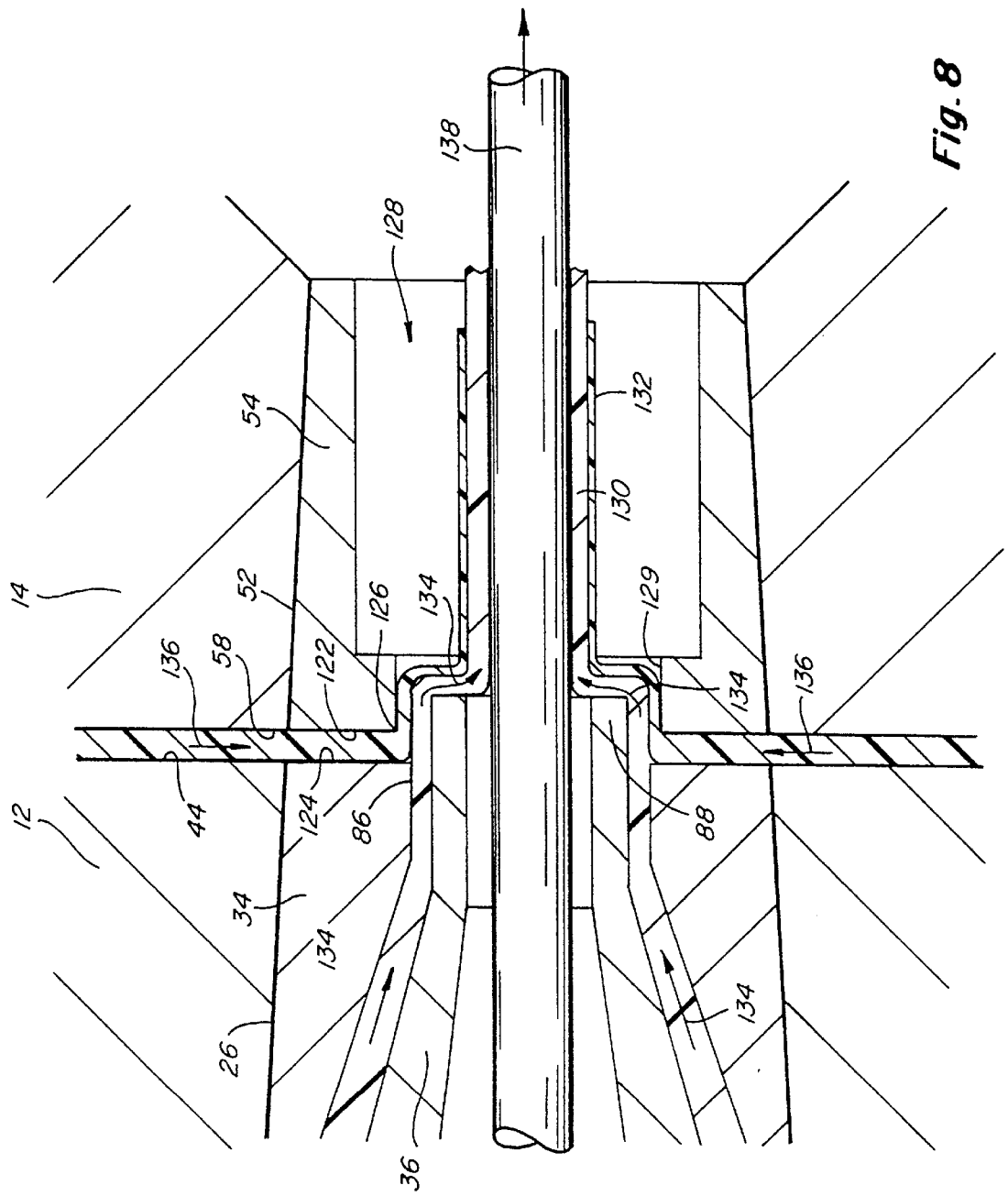
FIG. 8 is an enlarged view of a portion of the cross-section depicted in FIG. 7.

As shown most clearly in the enlarged cross-sectional view of FIG. 8, an end surface 122 of die member 54 aligns with the first surface 58 of second housing member 14. Similarly, an end surface 124 of die member 34 aligns with the end surface 44 of first housing member 12. End surface 122 of die member 54 defines an opening 126 of passage 128 which extends therethrough. The inner diameter of opening 126 is slightly larger than the inner diameter of cylindrical passage portion 86 of die member 34. Further, at least a portion 129 of the passage 128 extending from opening 126 is preferably cylindrical. When assembled, the nose portion 88 of die member 36 preferably extends beyond (to the right in FIG. 8) end surface 124 and through the opening 126 of die member 54 along at least a portion of the length of the cylindrical portion 129 of passage 128.

Referring to FIG. 7, in operation, as a wire is drawn through extrusion head 10, from left to right in this view, a coating material such as PVC enters inlet channel 80 and flows toward annular gap 106. Simultaneously, nylon enters inlet channel 70 and flows into and around recessed groove 62, then radially inward along the space between surfaces 44 and 58, toward the wire passing therethrough. The enlarged view of FIG. 8 depicts the coating material 130 and nylon 132, arrows 134 indicating the flow of coating material 130 and arrows 136 depicting the flow of nylon 132. The nylon flows inward and onto the coating material, and as the coating material 130 is drawn onto the wire 138 the nylon 132 is also drawn onto the wire 138 such that the two materials are applied substantially simultaneously.

From the preceding description of the illustrated embodiment, it is evident that the objects of the invention are attained. In particular, an extrusion head which allows for two materials to be coated onto a wire substantially simultaneously has been provided. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A wire coating apparatus comprising:

a first housing member having first and second ends, a passageway extending from end to end therethrough, an inlet channel extending through the housing member into the passageway, means positioned within the passageway of the first housing member for applying a layer of extrudable material onto a wire as the wire is drawn through the passageway from the first end to the second end thereof, the first housing member second end including an end surface which defines the opening of the passageway, a second housing member having first and second ends, a passageway extending from end to end therethrough, the first end of the second housing member adapted for attachment to the second end of the first housing member such that the respective passageways thereof are substantially aligned, the second housing member first end including a first surface which defines the opening of the passageway, a groove which surrounds the first surface and is recessed relative thereto, a second surface which surrounds the groove, the first surface being recessed relative to the second surface, wherein, when the second housing member is attached to the first housing member, the second surface of the second housing member makes sealing contact with the end surface of the first housing member and the first surface of the second housing member is positioned a predetermined distance from the end surface of the first housing member.

2. The wire coating apparatus of claim 1 wherein the predetermined distance is in the range of about five thousandths of an inch to about fifty thousandths of an inch.

3. The wire coating apparatus of claim 1 wherein the second housing member includes an inlet channel one end of which is positioned within the groove at a first location therealong, wherein the groove is offset relative to the second housing member passageway such that a distance from an inner edge of the groove to the passageway opening at the first location is greater than a distance from the inner edge of the groove to the passageway opening at a second location therealong.

4. The wire coating apparatus of claim 3 wherein the opening of the passageway of the second member is circumferential and the groove is circumferential, the second location along the groove being spaced approximately 180° from the first location.

5. The wire coating apparatus of claim 1 further comprising a relief channel one end of which is positioned within the groove, a second end of which is adapted for receiving a removable plug member.

6. The wire coating apparatus of claim 1 wherein the means positioned within the passageway of the first housing member comprises a first die member having first and second ends and a passage extending from end to end thereof, the second end of the first die member being aligned with the end surface of the first housing member.

7. The wire coating apparatus of claim 6 further comprising a second die member positioned within the second housing member passageway, the second die member including first and second ends and a passage extending from end to end thereof, the first end of the second die member being aligned with the first surface of the second housing member.

8. The wire coating apparatus of claim 7 wherein an opening defining the second end of the passage of the first die member is circumferential and an opening defining the first end of the passage of the second die member is circumferential, a diameter of the opening defining the passage of the second end of the first die member being smaller than a diameter of the opening defining the first end of the second die member.

9. The wire coating apparatus of claim 8 wherein the center of the opening defining the second end of the passage of the first die member is aligned with the center of the opening defining the first end of the passage of the second die member.

10. The wire coating apparatus of claim 1 wherein the second end of the first housing member includes a recessed portion, the end surface being positioned within the recessed portion, the first end of the second housing member includes a raised portion, the second surface of the first end of the second housing member being located on the raised portion, and the raised portion of the second housing member is configured to be inserted within the recessed portion of the first housing member.

11. A wire coating apparatus comprising:
a first housing member having first and second ends, a passageway extending from end to end therethrough, an inlet channel extending through the housing member into the passageway, the second end including an end surface which defines the opening of the passageway;
a first die member positioned within the first housing member passageway and including a nose portion which extends beyond the end surface of the first housing member;
a second housing member having first and second ends, a passageway extending from end to end therethrough, the first end of the second housing member adapted for attachment to the second end of the first housing member such that the respective passageways thereof are substantially aligned, the second housing member first end including a first surface which defines the opening of the passageway;
a second die member positioned within the passageway of the second housing member, the second die member including first and second ends, the first end positioned proximate to the first surface of the second housing member, a passage extending through the second die member including a cylindrical portion which extends from the first end along at least a portion of the length of the passage;
wherein, when the second housing member is attached to the first housing member, the nose portion of the first die member extends into the cylindrical portion of the passage of the second die member.

12. The wire coating apparatus of claim 11 wherein the second housing member includes a groove which surrounds the first surface and is recessed relative thereto, a second surface which surrounds the groove, the first surface being recessed relative to the second surface, and wherein, when the second housing member is attached to the first housing member to the second surface of the second housing member makes sealing contact with the end surface of the first housing member and the first surface of the second housing member is positioned a predetermined distance from the end surface of the first housing member.

13. The wire coating apparatus of claim 12 wherein the second housing member includes an inlet channel one end of which is positioned within the groove at a first location therealong.

14. An apparatus for coating an elongated member, comprising:
a first housing member having first and second ends, a passageway extending from end to end therethrough, an inlet channel extending through the housing member into the passageway, the second end of the first housing member including an end surface which defines an opening of the passageway;
a first die member positioned within the first housing member passageway and including a nose portion positioned toward the second end of the first housing member;
a second housing member having first and second ends, a passageway extending from end to end therethrough, the first end of the second housing member adapted for attachment to the second end of The first housing member such that the respective passageways thereof are substantially aligned, the second housing member first end including a first surface which defines an opening of the passageway;
a second die member positioned within the second housing member passageway, a passage extending through the second die member and including a cylindrical portion positioned toward the first end of the second housing member; and
wherein, when the second housing member is attached to the first housing member, the first surface of the second housing member is positioned a predetermined distance from the end surface of the first housing member, and the nose portion of the first die member extends into the cylindrical portion of the passage of the second die member.

15. The apparatus, as set forth in claim 14, wherein the first surface of the second housing member and the end surface of the first housing member are substantially planar.

* * * * *